United States Patent
Kitagawara et al.

(10) Patent No.: US 7,352,898 B2
(45) Date of Patent: Apr. 1, 2008

(54) IMAGE PROCESSING APPARATUS, IMAGE PROCESSING METHOD AND PROGRAM PRODUCT THEREFOR

(75) Inventors: Atsushi Kitagawara, Kanagawa (JP); Yoshiharu Hibi, Kanagawa (JP); Masaru Okutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 790 days.

(21) Appl. No.: 10/935,630

(22) Filed: Sep. 8, 2004

(65) Prior Publication Data

US 2005/0207644 A1 Sep. 22, 2005

(30) Foreign Application Priority Data

Mar. 22, 2004 (JP) ............................ P2004-083051

(51) Int. Cl.
*G06K 9/34* (2006.01)
(52) U.S. Cl. ...................... 382/173; 382/165; 382/167; 382/190; 382/298
(58) Field of Classification Search ................ 382/162, 382/167, 173, 190, 195, 203, 218, 282, 286, 382/298; 358/1.2, 518, 520, 521, 451
See application file for complete search history.

(56) References Cited

U.S. PATENT DOCUMENTS 6,327,382 B1 * 12/2001 Kaneda et al. .............. 382/164
6,993,184 B2 * 1/2006 Matsugu ..................... 382/173
7,046,343 B2 * 5/2006 Shibahara et al. .......... 355/406

FOREIGN PATENT DOCUMENTS

| EP | 1300827 A1 | 4/2003 |
|---|---|---|
| JP | 2000-040142 | 2/2000 |
| JP | 2003-134341 | 5/2003 |
| KR | 2003-0019359 A | 10/2002 |

\* cited by examiner

*Primary Examiner*—Phuoc Tran
(74) *Attorney, Agent, or Firm*—Morgan, Lewis & Bockius LLP

(57) ABSTRACT

An image processing apparatus includes: a reference object discriminating unit that discriminates a reference object from a digital image that is taken by capturing an object together with the reference object; a size information extracting unit that extracts size information of the reference object in the digital image; a size information comparing unit that acquires target size information of the reference object, and compares the size information of the reference object that is extracted by the size information extracting unit with the target size information; a correction size amount setting unit that sets a correction size amount on the basis of the comparison result of the size information comparing unit; and an image processing unit that performs image processing on the digital image in accordance with the correction size amount that is set by the correction size amount setting unit.

18 Claims, 7 Drawing Sheets

IMAGE PROCESSING APPARATUS, IMAGE PROCESSING METHOD AND PROGRAM PRODUCT THEREFOR

BACKGROUND OF THE INVENTION

1. Field of the Invention

The present invention relates to an image processing apparatus that process a captured image or the like and, more specifically, to an image processing apparatus and a program product therefore that correct each of a plurality of images that have been taken under different conditions.

2. Description of the Related Art

For example, in the printing market of using images for product handbills, advertisements, magazine articles, etc. and the business market of producing exhibition and seminar materials, photographs for recording actual sites, snapshots of merchandise such as real estate properties and products, and like things, work of arranging, at prescribed regions, a plurality of images such as images (image data, digital images) taken by a digital camera (digital still camera: DSC) or read by a scanner and outputting (visualizing) an edited layout image is performed commonly. Conventionally, for example, images to be subjected to layout are taken by a cameraman and edited while they are adjusted individually as a user who is an image processing expert checks the states of the respective images. On the other hand, in recent years, with the rapid development and spread of capturing devices as typified by digital cameras and cellular phones and the advancement of network technologies such as the Internet, cases have increased very much that a plurality of images taken by general users in a distributed manner under different capturing conditions are put together into a database.

Among background art techniques disclosed as patent publications is a technique in which target image data is acquired in which the tone is in a target state, gradation targets are extracted from the target image data, and then image conversion parameters suitable for a histogram corresponding to gradations are set (e.g., see JP-A-2003-134341 on pages 5 and 6, and FIG. 1). Another technique is disclosed in which to display a plurality of image data having indefinite image sizes on the screen in the form of multiple, easy-to-see images, the aspect ratios of read-in images are increased or decreased according to the ratios between the vertical dimensions (or horizontal dimensions) of display regions and those of the image data (e.g., see JP-A-2000-040142 on pages 4 and 5, and FIG. 1).

SUMMARY OF THE INVENTION

In a case where all of a plurality of image are taken under the same capturing conditions, it is possible to provide a layout image that is easy to see to users even if it is obtained by integrating the images taken. However, in a case of a plurality of images taken in different environments by different persons with different digital cameras under different capturing conditions, a resulting image is not easy to see if the images are layout-displayed as they are. For example, even where limited kinds of commodities such as commodity packages and toys are captured, if various capturing conditions (e.g., capturing location, time, object position, object angle, illumination, and camera used) are different, layout-displayed images become very poor because of subtle deviations in the size, position, inclination, etc. of the commodities. Not only differences in such geometrical characteristic parameters but also differences between images in characteristic parameters relating to image quality such as the lightness, color, gray balance, and gradation expression cause poor layout-displayed images.

For example, the technique of patent JP-A-2000-040142 makes it possible to equalize the sizes of displayed images. Making all images have the same size in the manner disclosed in JP-A-2000-040142 is meaningful in the case where absolute image sizes are not important as in the case of handling design drawings, for example. However, where it is necessary to compare the sizes of a plurality of images of commodity packages and small commodities, for example, merely converting images so that they will have the same size only for convenience in laying out the images does not necessarily produce preferable images. Although the technique of JP-A-2003-134341 can make images have the same tone as a target image does, all images taken under subtly different conditions (e.g., capturing conditions) are also given the same tone. As a result, resulting images may be much different from real images in such elements as the density, color, and contrast, in which case the quality of output images is much lowered. In particular, when a plurality of images are displayed and output being arranged (i.e., laid out) in a integrated manner, the images cannot be compared with each other correctly in contrast.

The present invention has been made to solve the above technical problems, and one of objects of the invention is therefore to correct individual images automatically taking their capturing conditions into consideration in outputting a plurality of images together.

Another object is to lay out in an integrated manner and output a plurality of images in such a state that they can be compared with each other more correctly in size and image quality.

According to a first aspect of the invention, there is provided an image processing apparatus including: a reference object discriminating unit that discriminates a reference object from a digital image that is taken by capturing an object together with the reference object, a size information extracting unit that extracts size information, in the digital image, of the reference object that is discriminated by the reference object discriminating unit; a size information comparing unit that acquires target size information of the reference object, and compares the size information of the reference object that is extracted by the size information extracting unit with the target size information; a correction size amount setting unit that sets a correction size amount on the basis of the comparison result of the size information comparing unit; and an image processing unit that performs image processing on the digital image in accordance with the correction size amount that is set by the correction Size amount setting unit.

According to a second aspect of the invention, there is provided an image processing apparatus including; a reference object discriminating unit that discriminates a reference object from a digital image that is taken by capturing an object together with the reference object; a color information extracting unit that extracts color information, in the digital image, of the reference object that is discriminated by the reference object discriminating unit; a color information comparing unit that acquires target color information of the reference object, and compares the color information of the reference object that is extracted by the color information extracting unit with the target color information; a correction color reproduction amount setting unit that sets a correction color reproduction amount on the basis of the comparison result of the color information comparing unit; and an image processing unit that performs image processing on the digital image in accordance with the correction color reproduction amount that is set by the correction color reproduction amount setting unit.

According to a third aspect of the invention, there is provided an image processing apparatus including: an image input unit that receives a plurality of digital images that are read from an image database in which digital images are stored; a reference object discriminating unit that discriminates image information of a reference object contained in each of the plurality of digital images that are received by the image input unit; a comparing unit that compares information including at least one of size information and color information included in the image information of the reference object discriminated by the reference object discriminating unit with information including at least one of target size information and target color information as a standard; a setting unit that sets at least one of a correction size amount and a correction color reproduction amount on the basis of the comparison result of the comparing unit for each of the plurality of digital images; and a processing unit that performs correction processing on each of the plurality of digital images in accordance with at least one of the correction size amount and the correction color reproduction amount that is set by the setting unit.

According to a fourth aspect of the invention, there is provided an image processing method including: reading out a plurality of digital images each of which is taken by capturing an object together with a reference object; discriminating the reference object from each of the plurality of digital images; extracting size information, in the digital image, of the discriminated reference object; acquiring target size information of the reference object; setting a correction size amount for each of the plurality of digital images on the basis of the extracted size information of the reference object and the acquired target size information; and performing a process of scaling up or down the object in each of the plurality of digital images in accordance with the correction size amount.

According to a fifth aspect of the invention, there is provided an image processing method including: reading out a plurality of digital images each of which is taken by capturing an object together with a reference object; discriminating the reference object from each of the plurality of digital images; extracting color information, in the digital image, of the discriminated reference object; acquiring target color information of the reference object; setting a correction color reproduction amount for each of the plurality of digital images on the basis of the extracted color information of the reference object and the acquired target color information; and performing color correction processing on the object in each of the plurality of digital images in accordance with the set correction color reproduction amount.

According to a sixth aspect of the invention, there is provided an image processing program product for causing a computer to execute procedures including: reading out a plurality of digital images each of which is taken by capturing an object together with a reference object; discriminating the reference object from each of the plurality of digital images; extracting size information, in the digital image, of the discriminated reference object; acquiring target size information of the reference object; setting a correction size amount for each of the plurality of digital images on the basis of the extracted size information of the reference object and the acquired target size information; and performing a process of scaling up or down the object in each of the plurality of digital images in accordance with the correction size amount.

According to a seventh aspect of the invention, there is provided an image processing program product for causing a computer to execute procedures including: reading out a plurality of digital images each of which is taken by capturing an object together with a reference object; discriminating the reference object from each of the plurality of digital images; extracting color information, in the digital image, of the discriminated reference object; acquiring target color information of the reference object; setting a correction color reproduction amount for each of the plurality of digital images on the basis of the extracted color information of the reference object and the acquired target color information; and performing color correction processing on the object in each of the plurality of digital images in accordance with the set correction color reproduction amount.

BRIEF DESCRIPTION OF THE DRAWINGS

The above objects and advantages of the present invention will become more apparent by describing in detail with reference to the accompanying drawings, wherein.

DETAILED DESCRIPTION OF THE PREFERRED EMBODIMENT

An embodiment of the present invention will be hereinafter described in detail with reference to the accompanying drawings.

Figure 1:
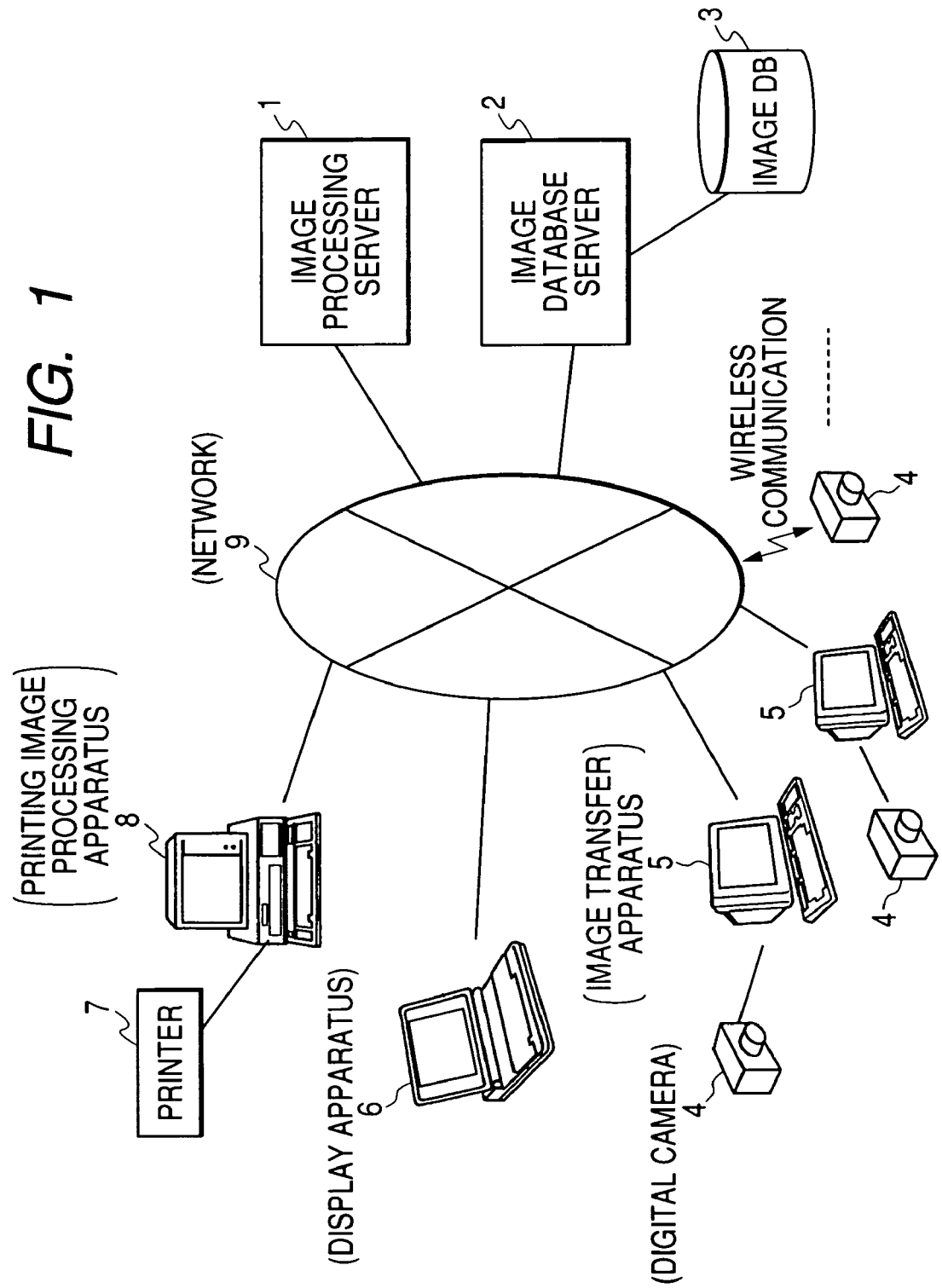
FIG. 1 shows the entire configuration of an exemplary image processing system according to an embodiment.

FIG. 1 shows the entire configuration of an exemplary image processing system according to the embodiment. In the image processing system, various apparatuses are connected to each other via a network 9 such as the Internet. The image processing system of FIG. 1 is provided with an image processing server 1 for performing integrated layout processing on images that were taken in a distributed manner, an image database server 2 for acquiring images that were taken in a distributed manner and selecting images to be subjected to the integrated layout processing, and one or a plurality of image databases (image DBs) 3 that are connected to the image database server 2 and store images that were taken in a distributed manner. The image processing system is also provided with image transfer apparatus 5 for reading images taken by digital cameras 4 as capturing means and transferring those to the image database server 2 via the network 9, a display apparatus 6 for displaying images that have been subjected to the integrated layout processing in the image processing server 1, and an printing image processing apparatus 8 for performing various kinds of image processing that are necessary for allowing a printer 7 as an image print output unit to output images that have been subjected to the integrated layout processing in the image processing server 1. Each of the image transfer apparatus 5, the display apparatus 6, and the printing image processing apparatus 8 may be a computer such as a notebook-sized computer (notebook-sized PC) or a desk-top PC. Each of the image processing server 1 and the image database server 2 may be configured by one of various kinds of computers such as PCs. In the embodiment, a plurality of images that were taken in a distributed manner at different locations under different capturing conditions are integrated together. To this end, the plurality of digital cameras 4 are provided at several locations and the plurality of image transfer apparatus 5 that are connected to the respective digital cameras 4 are connected to the network 9. Another configuration is possible in which each digital camera 4 accesses the network 9 via a relay station (not shown), for example, using its own communication function and sends captured images directly to the image processing server 1. Still another configuration is possible in which each digital camera 4 having a wireless LAN function accesses the network 9 via an access point (not shown) and sends captured images directly to the image processing server 1.

Now, to facilitate understanding, the integrated layout processing according to the embodiment will be compared with conventional layout processing.

Figure 7:
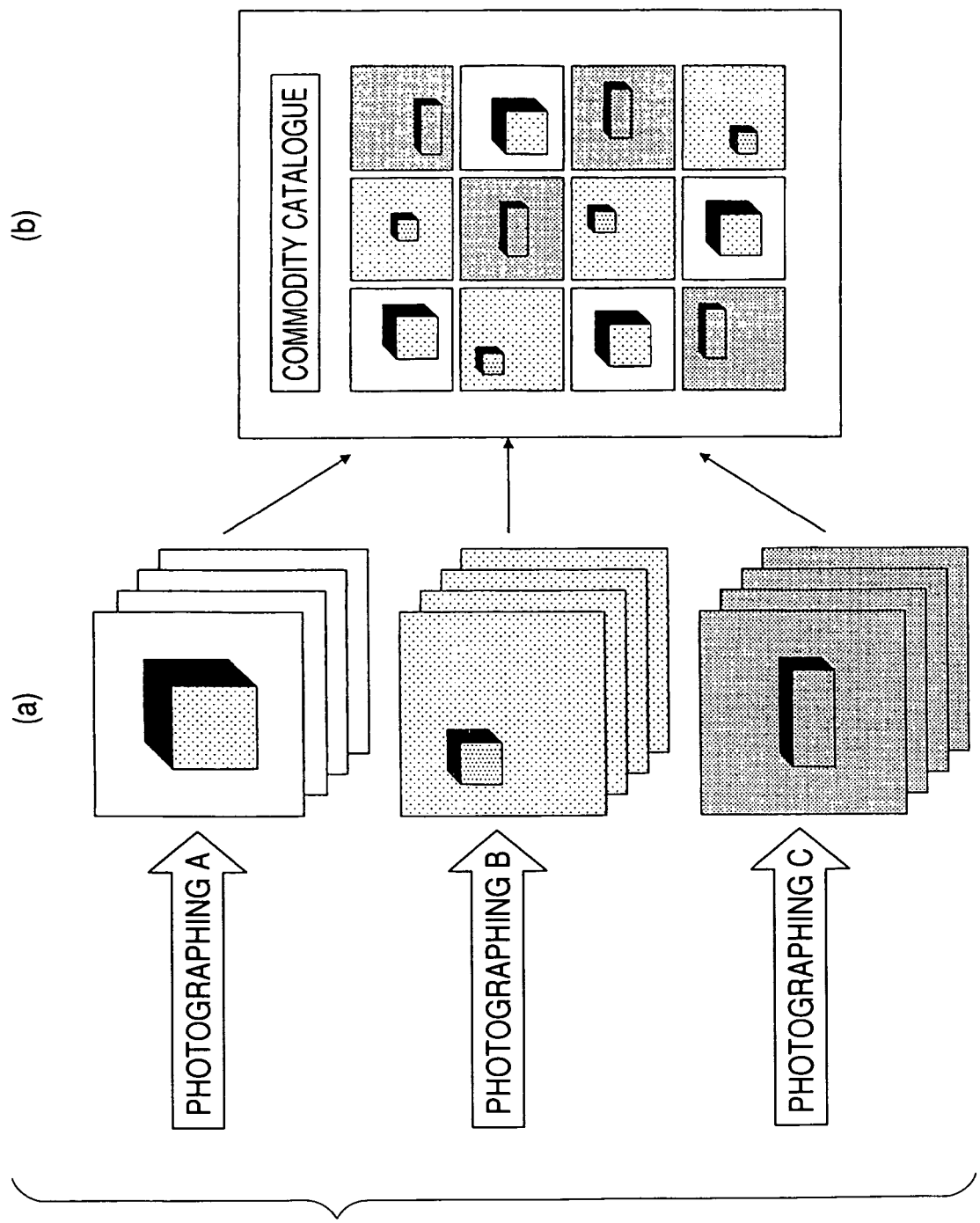
FIG. 7 shows an example in which the integrated layout processing according to the embodiment has not been performed.

FIG. 7 shows an example in which the integrated layout processing according to the embodiment has not been performed. As shown in column (a) of FIG. 7, capturing A, capturing B, and capturing C produce images in different environments and the images are sent from the image transfer apparatus 5, for example, to the image database server 2 and stored in the image DB(s) 3 as one or a plurality of memories. For example, in documents of capturing A, main objects are captured so as to become relatively large figures and capturing is performed at sufficiently high brightness so as to produce images whose lightness is relatively high. In documents of capturing B, main objects are captured so as to become small figures and the lightness of images is not high. Further, the main objects are deviated from the centers. In documents of capturing C, main objects are captured so as to become figures having proper sizes but the illuminance is very low to produce dark images. If the images taken under such different capturing conditions are laid out without being subjected to any processing, a result becomes as shown column (b) of FIG. 7, for example. The sizes of figures corresponding to the main objects vary to a large extent and their positions in the respective images are not fixed. Further, the image quality, that is, the lightness, the color representation, etc., varies to a large extent and hence the quality of a resulting document is very low. Although it is possible to equalize capturing condition relying on a user's experience, it is difficult to compare a plurality of images correctly in size and image quality.

Figure 6:
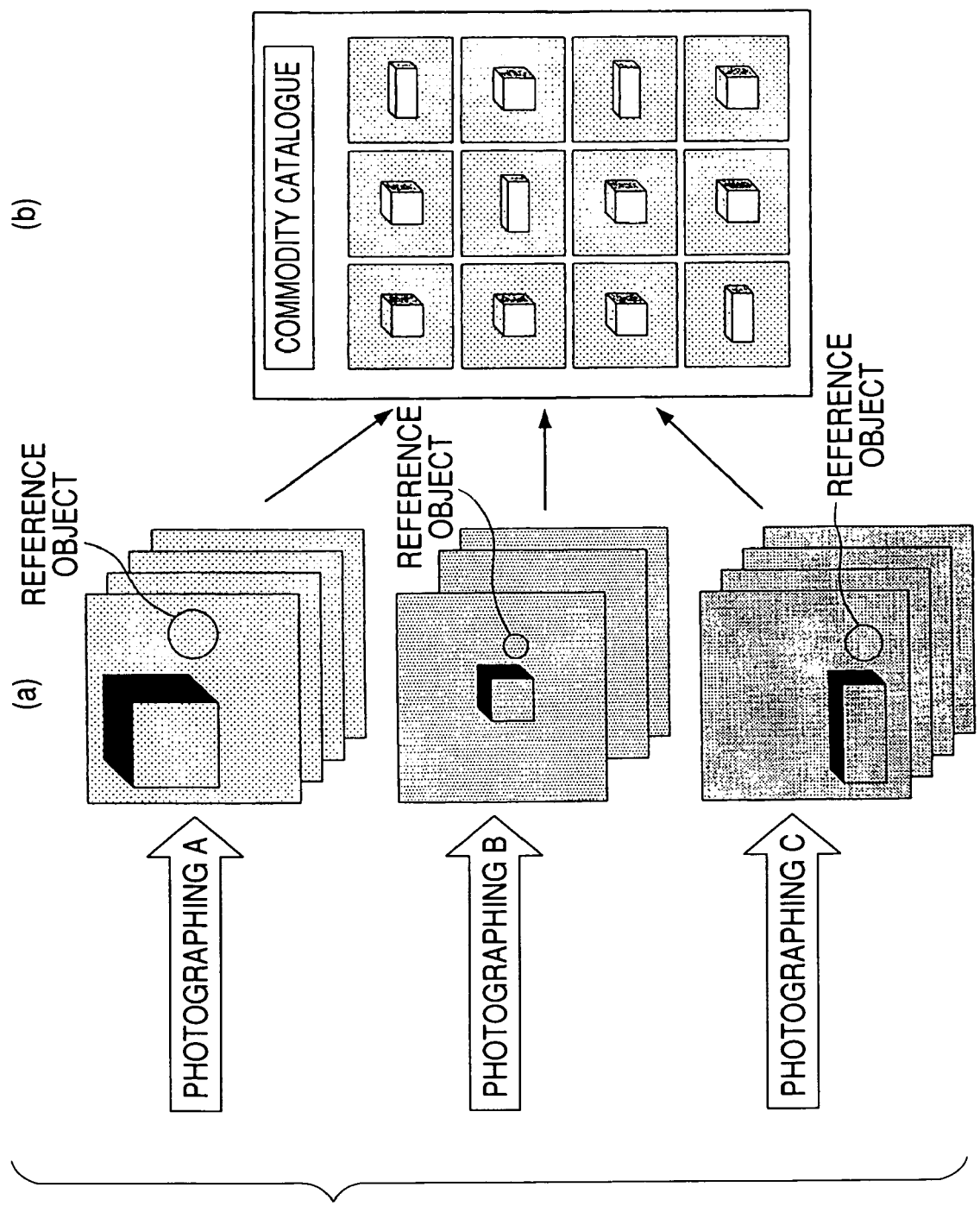
FIG. 6 shows an example in which the integrated layout processing according to the embodiment has been performed.

FIG. 6 shows an example in which the integrated layout processing according to the embodiment has been performed. When images as shown in column (a) of FIG. 6 that are taken in different environments and hence have different levels of image quality and different object geometrical features are subjected to the integrated layout processing, a integrated document as shown in column (b) of FIG. 6 can be obtained automatically by using a statistical method by virtue of the employment of the embodiment. In the embodiment, the main object and a prescribed reference object are captured together to produce each of the images shown in column (a) of FIG. 6.

The above integrated document is produced in the following manner. A reference object that provides size and image quality references is captured together with the main object in the distributed capturing, processing standards of the size and the image quality are determined on the basis of the captured information, and then correction processing is performed. That is, geometrical characteristic parameters and image quality characteristic parameter of the main object are extracted from each of the images shown in column (a) of FIG. 6 and characteristic parameters of the reference object are extracted at the same time. Processing standards for the integrated layout processing are calculated from the extracted characteristic parameters (size, image quality, etc.) of the reference object. More specifically, the geometrical characteristic parameters and the image quality characteristic parameter of the main object are corrected on the basis of the extracted characteristic parameters of the reference object. The correction is made so that the images are integrated and made easy to see when the integrated layout processing is performed. The discriminated reference object is removed from each image and the remaining space is filled so as to conform to a background picture and color. By performing such integrated layout processing, an attractive layout image in which the constituent images are integrated in size, position, background, lightness, etc. can be obtained like a commodity catalogue shown in column (b) of FIG. 6, for example.

It is preferable that the shape of the reference object not depend on the capturing angle. For example, a spherical reference object is preferable. It is preferable that the color of the reference object be white that can be used as a white reference, achromatic gray that facilitates recognition of white balance, or a like color.

Figure 2:
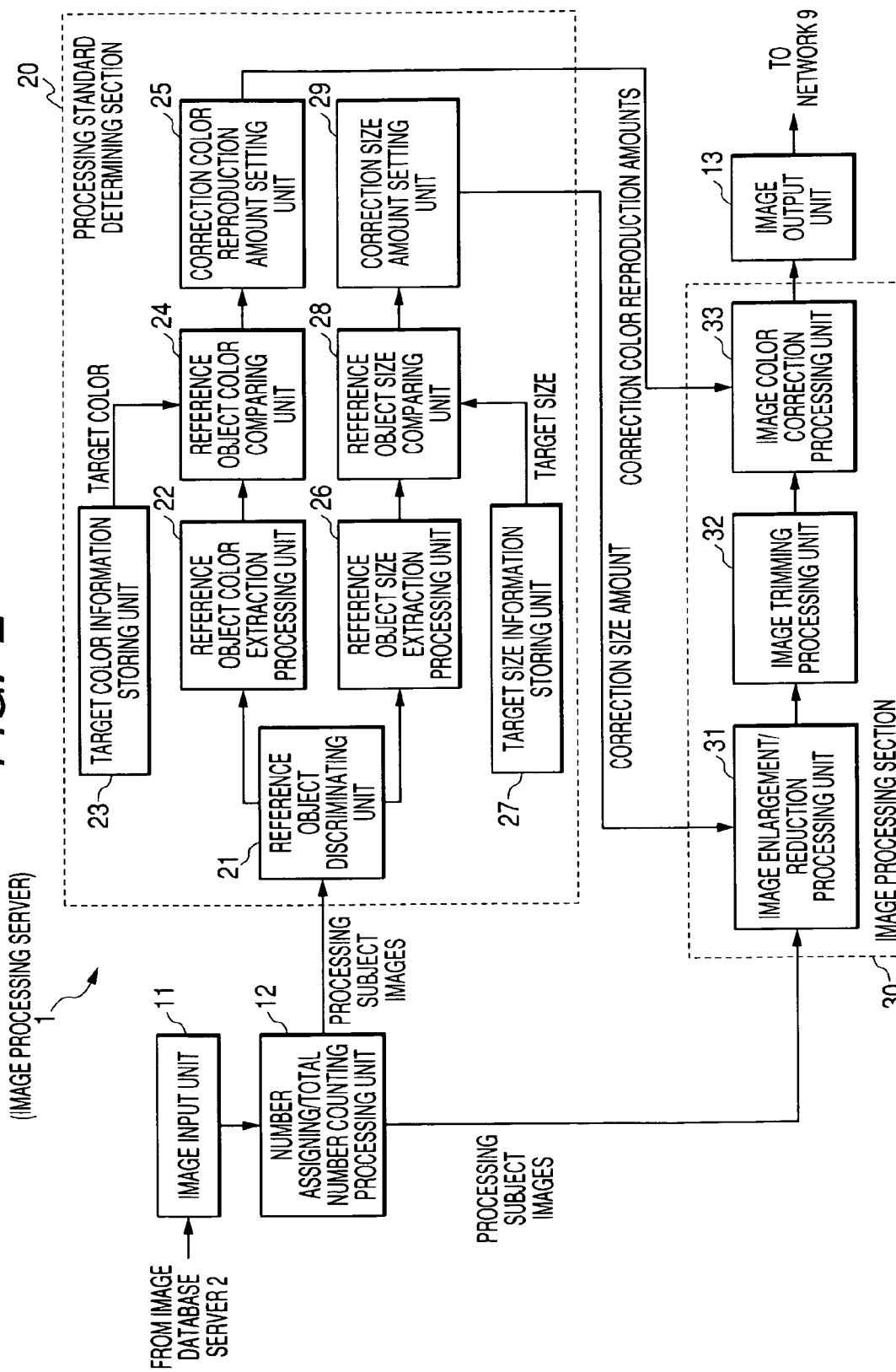
FIG. 2 shows functional blocks for performing integrated layout processing according to the embodiment.

FIG. 2 shows functional blocks for performing the integrated layout processing according to the embodiment that was described above with reference to FIG. 6. The image processing server 1 that mainly performs the integrated layout processing is equipped with an image input unit 11 for acquiring image data (digital images) stored in the image database 3 from the image database server 2, a number assigning/total number counting processing unit 12 for performing preprocessing such as is assigning of image numbers Gn to a plurality of images that have been input through the image input unit 11 and total number counting, and an image output unit 13 for sending image-processed images to the network 9 individually or in a laid-out state. The image processing server 1 is also equipped with a processing standard determining section 20 for acquiring geometrical characteristic parameters and image quality characteristic parameters from a reference object contained in each processing subject image that has been processed by the number assigning/total number counting processing unit 12 and for calculating processing standards, and an image processing section 30 for analyzing characteristic parameters of an individual image that has been input through the image input unit 11 and subjected to the preprocessing such as the assigning of an image 5 number Gn and the total number counting in the number assigning/total number counting processing unit 12 and for performing various kinds of image processing on the individual image on the basis of an output of the processing standard determining section 20.

The above sections 20 and 30 will be described below individually. The processing standard determining section 20 is equipped with a reference object discriminating unit 21 for separating and discriminating a reference object that is contained in each image to be subjected to the integrated layout processing, a reference object color extraction processing unit 22 for extracting color information (may be referred to simply as "color") of the reference object that has been discriminated by the reference object discriminating unit 21, a target color information storing unit 23 in which target color information that was set on the basis of the reference objects that were not captured yet is stored in advance, a reference object color comparing unit 24 for comparing the color information of the reference object that has been discriminated by the reference object color extraction processing unit 22 with the target color information that is read from the target color information storing unit 23, and a correction color reproduction amount setting unit 25 for setting correction color reproduction amounts that are obtained from a comparison result of the reference object color comparing unit 24. The processing standard determining section 20 is also equipped with a reference object size extraction processing unit 26 for extracting size information (may be referred to simply as "size") of the reference object that has been discriminated by the reference object discriminating unit 21, a target size information storing unit 27 in which target size information that was set on the basis of the reference objects that were not captured yet is stored in advancer a reference object size comparing unit 24 for comparing the size information of the reference object that has been extracted by the reference object size extraction processing unit 26 with the target size information that is read from the target size information storing unit 27, and a correction size amount setting unit 29 for setting a correction size amount that is obtained from a comparison result of the reference object size comparing unit 28. As for the target color information storing unit 23 and the target size information storing unit 27, diameters of the reference objects such as spherical objects or pieces of color information (L*a*b* information) or the like of the spherical objects are stored in a prescribed memory (not shown) and read sequentially in processing subject images. The target value information that is stored in the target color information storing unit 23 or the target size information storing unit 27 is "reference values" as the color information of the reference objects themselves used for capturing by the respective digital cameras 4 or "reference values" as the size information of the reference objects themselves. The reference values may be read out in such a state as to be enlarged or reduced by a prescribed factor on the basis of the size or the like of images to be printed.

The image processing section 30 is equipped with an image enlargement/reduction processing unit 31 for sequentially reading out images to be subjected to the integrated layout processing and performing enlargement/reduction processing on each of those images, an image trimming processing unit 32 for taking a main object and a reference object out of the image that has been subjected to the enlargement/reduction processing in the image enlargement/reduction processing unit 31, and an image color correction processing unit 33 for performing various kinds of image processing such as a color correction on the main object obtained by the trimming processing of the image trimming processing unit 32 and removal of the reference object/filling of the remaining space with a background color. The images that have been subjected to the color correction in the image color correction processing unit 33 are sequentially passed to the image output unit 13. The image enlargement/reduction processing unit 31 performs enlargement or reduction on the basis of the correction size amount that has been set by the correction size amount setting unit 29 of the processing standard determining section 20. The image color correction processing unit 33 performs color correction processing on the basis of the color reproduction amounts that have been set by the correction color reproduction amount getting unit 25 of the processing standard determining section 20.

Each of the units of the image processing server 1 that are shown in FIG. 2 are performed by a CPU of the image processing server 1 by using a RAM or the like as a work memory. For example, the target color information storing unit 23 and the target size information storing unit 27 are implemented by a storage medium such as a hard disk drive (HDD) provided in the image processing server 1.

Next, a description will be made of processing that is performed by each of the functional blocks (units) shown in FIG. 2.

Figure 3:
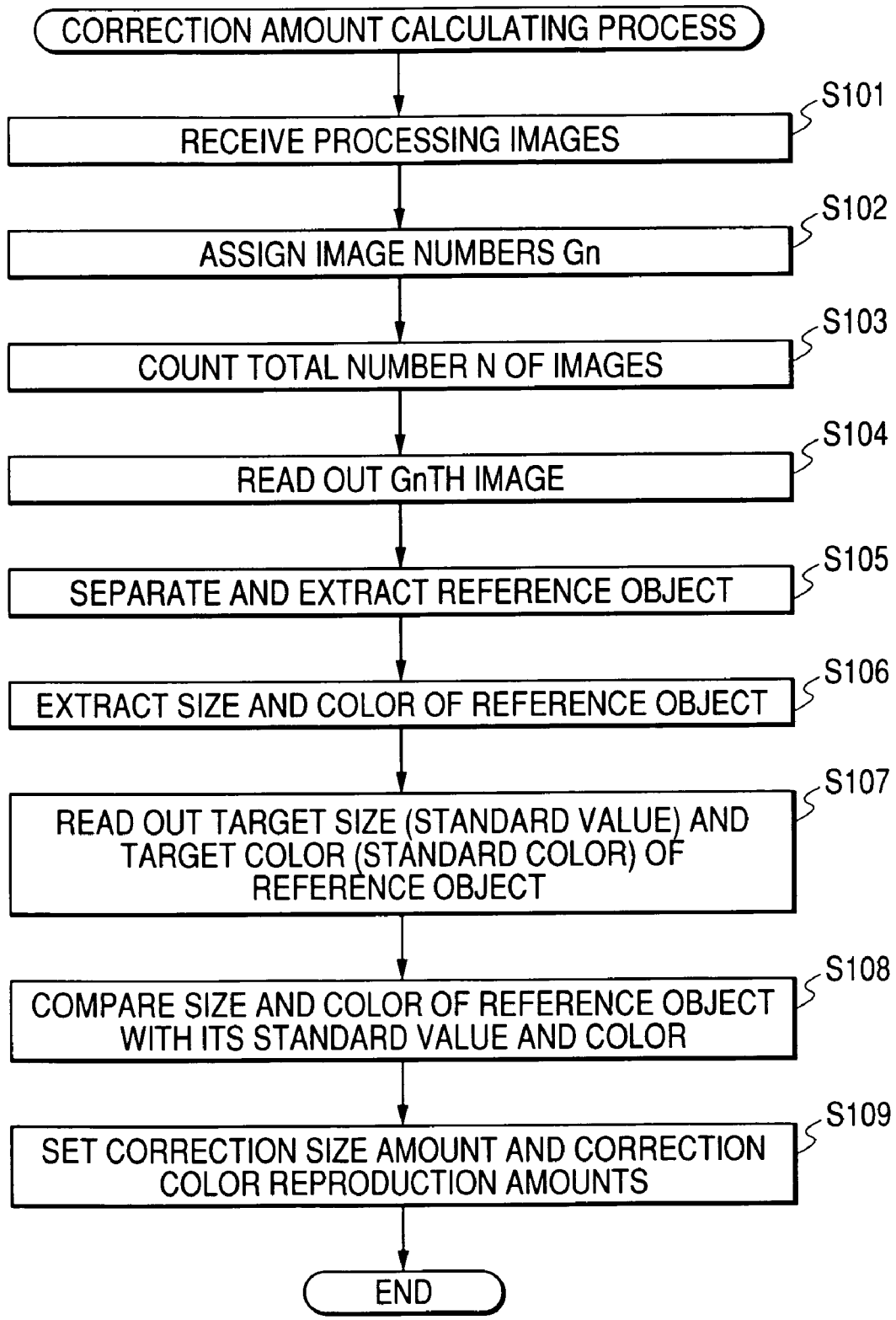
FIG. 3 is a flowchart of a process that is mainly executed by a processing standard determining section, that is, a process for calculating correction amounts on the basis of each reference object.

FIG. 3 is a flowchart of a process that is mainly executed by the processing standard determining section 20, that is, a process for calculating correction amounts on the basis of each reference object. In the image processing server 1, the image input unit 11 receives processing subject images (image data, digital images) (step 101). The number assigning/total number counting processing unit 12 assigns image numbers On to the input images (step 102) and counts the total number N of images (step 103). The processing standard determining section 20 reads out a Gn-th image to be processed by the image processing section 30 (step 104) and sets processing standards.

In the processing standard determining section 20, first, the reference object discriminating unit 21 separates and discriminates a reference object that is contained in the Gnth image (step 105). Where the reference object is spherical, the reference object can be discriminated by preparing a circular digital mask and performing pattern matching with a circle by performing a filtering scan on the entire image. Or a circular reference object can be discriminated by binarizing an input image signal, separating a background and a plurality of objects from each other, determining the center and an edge of each object, and calculating the distance between the center and the edge around the center (for 360 degrees). From the viewpoint of reducing the number of patterns with which a match is to be found, the employment of a spherical reference object is superior. Naturally, it is possible to employ a reference object that is rectangular or has some other shape by preparing a plurality of patterns taking the capturing angle etc. into consideration. A the reference object image thus discriminated is passed to the reference object color extraction processing unit 22 and the reference object size extraction processing unit 26.

In the reference object size extraction processing unit 26 and the reference object color extraction processing unit 22, size information (size) and color information (color) of the reference object are discriminated (step 106). In this size extraction from the reference object, a size itself, for example, of the reference object in the processing subject image is measured. For example, if the reference object is spherical, a diameter of the sphere in the captured image is extracted. For example, in this color information extraction from the reference object, a color conversion in which the characteristics of the digital camera 4 are taken into consideration is performed from R (red), G (green), and B (blue) signals into signals in an L*a*b* color space which is a uniform color space. The characteristics of each digital camera 4 are provided as part of an image format such as EXIF (exchangeable image file format when a digital image is acquired. The reference object color extraction processing unit 22 can recognize the characteristics of each digital camera 4 by using such information.

Then, in the processing standard determining section 20, a target size (standard value) and a target color (standard color) of the reference object are read from the target size information storing unit 27 and the target color information storing unit 23, respectively (step 107). The reference object size comparing unit 28 compares the size of the reference object that has been obtained from the image with the standard value that has been supplied from the target size information storing unit 27, and the reference object color comparing unit 24 compares the color of the reference object that has been obtained from the image with the standard color that has been supplied from the target color information storing unit 23 (step 108). Then, the correction size amount setting unit 29 and the correction color reproduction amount setting unit 25 set a correction size amount and correction color reproduction amounts, respectively (step 109). The correction amount calculating process is then finished. In the setting of correction color reproduction amounts, the L*a*b* values of the reference object image produced by the conversion are compared with those of the target color in the reference object color comparison of the reference object color comparing unit 24, whereby a gradation correction reproduction amount is obtained from the L* value and a gray balance correction reproduction amount or the like are obtained from the a*b* values. The luminance/color difference signals into which conversion is made may be YCc signals instead of L*a*b* signals. The luminance/color difference signals obtained by the conversion are compared with the target color information, and a color reproduction amount setting means may be constructed so as to obtain a gradation correction amount from the luminance signal (L*, Y, or the like) of the luminance/color difference signals and obtain a gray balance correction amount from the color difference signals (a*b*, CC, or the like). In the YCC color space, Y represents the luminance (lightness) and CC represents the color (color difference).

For example, each of the target color information storing unit 23 and the target size information storing unit 27 may be constructed in such a manner that target information of a reference object is stored in the memory for each type of processing subject image. For example, target information of reference object A is stored for a confectionery package and target information of reference object B is stored for a toy such as a miniature car. It is possible to cause a user to set individual target values for each reference object. Further, they system may be configured so that when each digital image is read into the image processing server 1 it is associated with target values of a reference object. For example, this is done in such a manner that the image database server 2 supplies each digital image with its attributes added to it. Where it is difficult to add attributes automatically, it is effective to cause a user to add attributes (or a type). It is also possible to input target values to an area of EXIF, for example, capable of storing unique information of each digital image. In this case, as long as capturing is performed by a digital camera 4 capable of burying unique information in such an area, the image processing server 1 can read out the unique information automatically and acquire target values easily.

Next, a flow of the image correction processing will be described.

Figure 4:
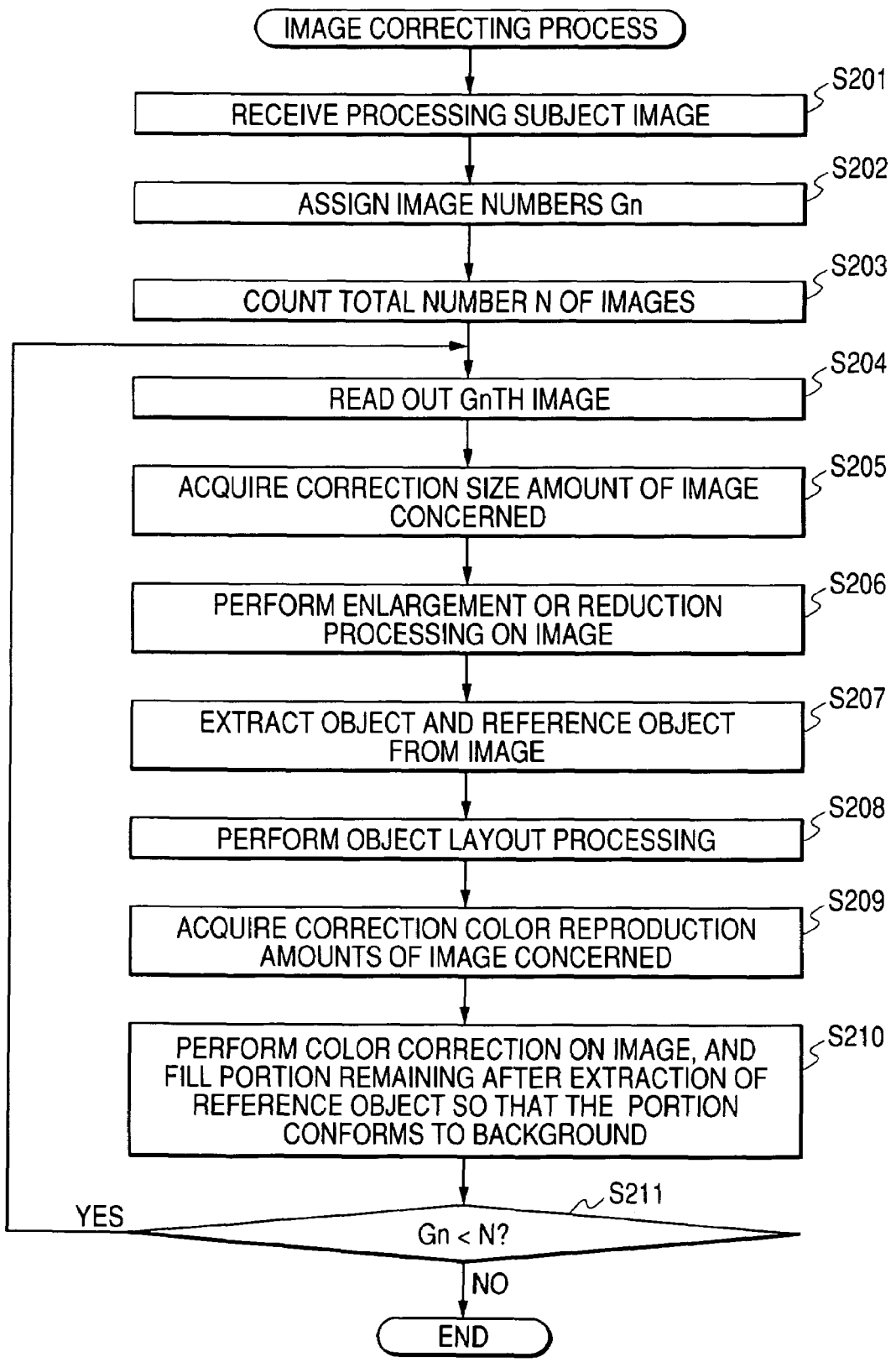
FIG. 4 is a flowchart of an image correction process that is mainly executed by an image processing section.

FIG. 4 is a flowchart of an image correction process that is mainly executed by the image processing section 30. In the image processing server 1, first, the image input unit 11 receives processing subject images (image data, digital images) (step 201). The number assigning/total number counting processing unit 12 assigns image numbers Gn to the input images (step 202) and counts the total number N of images (step 203). The image processing section 30 reads out a Gn-th image to be subjected to the image correction processing step 204). Then, the image processing section 30 acquires a correction size amount, set by the processing standard determining section 20, of the image concerned (i.e., Gn-th image) (step 205). The image enlargement/reduction processing unit 31 of the image processing section 30 performs enlargement/reduction processing on the image concerned using the acquired correction size amount (step 206).

The image trimming processing unit 32 of the image processing section 30 identifies and discriminates an object and a reference object from the image that has been subjected to the enlargement/reduction processing (step 207). The image trimming processing unit 32 performs an object layout processing of, for example, moving the extracted object to the center of the image (step 208). Then, the image processing section 30 acquires correction color reproduction amounts, set by the processing standard determining section 20, of the image concerned (i.e., Gn-th image) (step 209). The image color correction processing unit 33 of the image processing section 30 performs a color correction on the layout-processed image on the basis of the acquired correction color reproduction amounts, and also performs processing of filling the portion that remains after the extraction of the reference object so that the remaining portion conforms to a picture of a background that is the portion of the image other than the object (step 210). At this time, it is preferable that not only is the image information of the reference object replaced by the background image information but also image information that occurs in association with the reference object such as its shadow because of its relationship with incident light be replaced by the background image information.

Then, the image output unit 13 outputs a corrected image. It is determined here whether the image number Gn is smaller than the total number N of images (step 211). If Gn is smaller than the total number N of images, the process returns to step 204 to execute above steps again. If Gn is not smaller than the total number N of images, it is determined that all the images N have been subjected to the correction processing and the image correction process is finished. The image that has been processed by the image processing section 30 in the above-described manner is subjected to layout processing in the image output unit 13, whereby a integrated layout image as shown in FIG. 6(b) is output from the image output unit 13. The system may be configured so that the image output unit 13 outputs constituent images one by one and final integration processing is performed by a terminal (e.g., the display apparatus 6 or the printing image processing apparatus 8) that performs output (including display) of a layout image.

At step 208, the movement of the object to the center of the image is performed in the following manner. Binarization is performed first and then labeling is performed on the object. Then, a maximum circumscribed rectangle is calculated for the object that has been subjected to the labeling. For example, where the origin of the coordinate system is located at the top-left corner, vertical and horizontal edges of a maximum circumscribed rectangle are calculated by: a topmost segment having smallest coordinate value; a leftmost segment having smallest coordinate value; a bottommost segment having largest coordinate value; and a rightmost segment having largest coordinate value. Once a circumscription start position of the object is calculated in this manner, the center of gravity of the object can be determined. The position of the center of gravity of the object of each image is moved to the center of the image, whereby a integrated layout image that is easy to see to users can be obtained.

In addition to the above-described processing, the image processing section 30 may also perform background removal, background integration, or image quality enhancement processing such as a lightness correction, a color correction, a gray balance correction, or gradation correction. Further, for example, the image processing section 30 may also have such functions as smoothing for noise suppression, a lightness correction for moving a reference point depending on, for example, whether the correction subject image is on the bright side or dark side in a distribution of images, a highlight/shadow correction for adjusting a distribution characteristic of a bright portion and a shadow portion in a distribution of images, and a light/shade contrast correction for correcting light/shade contrast by obtaining a distribution state from a light/shade distribution histogram. For example, the image processing section 30 may also have such functions as a hue/color balance correction for correcting a color deviation of white portions with a brightest white region as a reference, a saturation correction for performing such processing as making an image with somewhat low saturation more vivid and lowing the saturation of an image that is close to gray, and a stored color correction relating to a particular stored color such as making a skin color closer to a stored one as a reference color. Still further, the image processing section 30 may also have a sharpness enhancement function that determines edge intensity from edge level of the entire image and corrects the image to a sharper one, for example. Not only are characteristic parameters of each object merely corrected to standard values such as a target color and a target size of a reference object in the above-described manner, processing that makes images easier to see to users may be added to the integrated layout processing.

In the image processing section 30, the image enlargement/reduction processing unit 31 scales up or down an image before the image trimming processing unit 32 performs trimming processing. However, the enlargement/reduction processing may be performed on only the image data of an extracted object.

Figure 5:
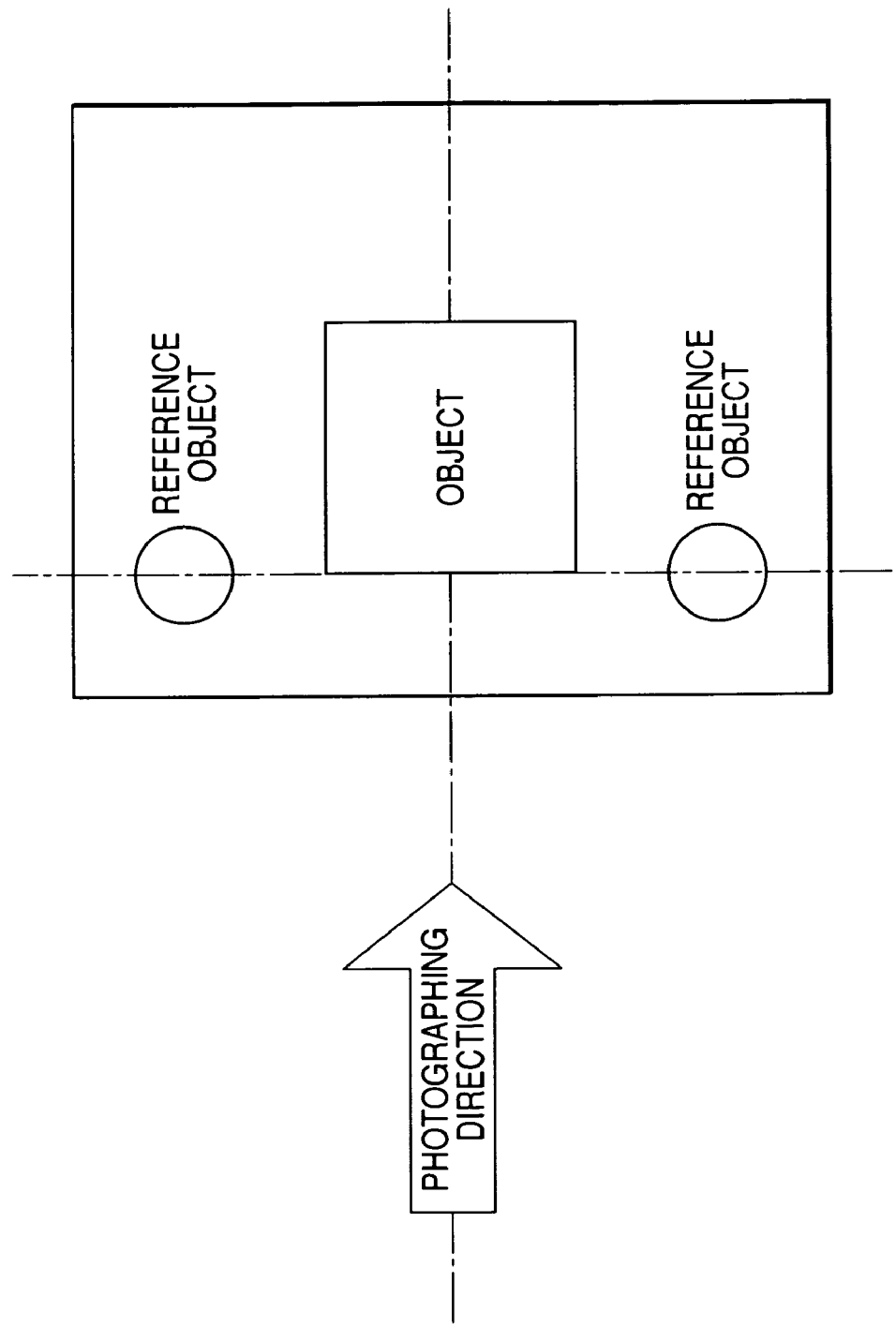
FIG. 5 illustrates relationships between the direction of capturing for producing a digital image and an object and reference objects.

FIG. 5 illustrates positional relationships between the direction of capturing for producing a digital image and an object and reference objects. It is preferable that a reference object be located at a prescribed position with respect to an object to be captured. For example, in general commodity capturing, as shown in FIG. 5, reference objects are arranged so as to be flush with a portion of the object that is closest to the digital camera 4 in the capturing direction of the digital camera 4. To increase the size accuracy further, it is preferable that the distances between the object and the plurality of (i.e., two) reference objects be the same. If a digital image that is obtained by capturing the object and the reference objects that are arranged as shown in FIG. 5, the size of the object can be adjusted accurately in the correction of the integrated layout processing.

As described above in detail, according to the embodiment, when a plurality of digital image data taken by, for example, different digital cameras 4 under different conditions (light sources, locations, times, etc.) are put into a database and displayed or printed in an array, they can be corrected with their absolute sizes recognized and images thus corrected can be displayed or printed. This technique is indispensable when images taken at several places in the world are displayed or printed in list form and compared with each other. Images taken under different capturing conditions can be displayed or printed after being converted so as to have the same level of image quality on the basis of information that is obtained from reference objects of the respective images: the document image quality can thus be increased when a plurality of images are displayed. Where the reference object used in the embodiment is spherical, size information can be extracted correctly even with different capturing angles or camera positions. Where the reference object is spherical, a reference object suitable for the size of an object can be formed easily. Further, since a reference object is removed from an image in the size and image quality correction processing, the document image quality can further be increased.

The reference object may have any shape. However, as described above, it is particularly preferable to use a spherical shape which is a fundamental shape. It is possible to cover objects ranging from a large one to a very minute one by employing proper materials and working methods for producing spherical reference objects. That is, while the embodiment is useful for capturing of packaged commodities and processing of image data for car sale, for example, the embodiment can freely be applied, by switching reference objects, to capturing of various objects ranging from buildings or their models with which size and image quality comparisons are important to small or minute objects that can be observed with a microscope.

If the image processing server 1 is configured in such a manner that the input of a target color and a target size from the target color information storing unit 23 and the target size information storing unit 27 is performed through a user interface, an object can be corrected so as to have an arbitrary size and image quality in accordance with a purpose. Further, a list image suitable for a use and a purpose can be generated by setting a target size by manual setting or automatic judgment setting. A target size may be set by employing a minimum size, a maximum size, an average size, or the like. Further, the image processing server 1 may be configured in such a manner that things that are generated by illumination such as a shadow of a reference object is likewise removed so as not to appear in a final image.

It is expected that the embodiment is used in various forms such as an application form, a printer driver form, and a form of cooperation with a digital camera. An exemplary application form is such that the embodiment is used as a function of making an album using images taken by a digital still camera (DSC) or a function of automatically adjusting images acquired by a user as a plug-in or the like of management software. An exemplary printer driver form is such that the embodiment is used as a function that can be selected as an optional function in driver setting or a function that is incorporated in mode setting itself. An exemplary form of cooperation with a digital camera is such that the embodiment is used as a function that enables issuance of an adjustment instruction at a printing stage (tag information is buried in a file format).

A computer program to which the embodiment is applied is supplied to computers not only in such a manner that it is installed in the computers but also in a form that it is stored in a storage medium so as to be readable by the computers. Exemplary storage media are various DVDs, CD-ROM media, and card-type storage media. The program is read by a DVD or CD-ROM reading device, a card reading device, or the like that is provided in each of the computers. The program is stored in any of various memories of each of the computers such as an HDD and a flash ROM and executed by a CPU. Alternatively, the program may be supplied from a program transmission apparatus via a network.

For example, the invention can be applied to a computer that is connected to an image forming apparatus such as a printer, a server that presents information via the Internet or the like, and a digital camera, as well as a program that is executed in those various kinds of computers.

According to a first aspect of the invention, the image processing apparatus includes; a reference object discriminating unit for discriminating a reference object from a digital image that is taken by capturing an object together with the reference object; a size information extracting unit for extracting size information, in the digital image, of the reference object that is discriminated by the reference object discriminating unit; a size information comparing unit for acquiring target size information of the reference object, and for comparing the size information of the reference object that is extracted by the size information extracting unit with the target size information; a correction size amount setting unit for setting a correction size amount on the basis of a comparison result of the size information comparing unit; and an image processing unit for performing image processing on the digital image, that is, enlarging or reducing the object in the digital image, in accordance with the correction size amount that is set by the correction size amount setting unit.

The image processing apparatus may further include a replacing unit for replacing image information of the reference object contained in the digital image with background image information in the digital image. This configuration is preferable in that no useless body appears in a resulting image including the object. The replacing unit may configured to replace, with the background image information, image information that is generated so as to be associated with the reference object when the digital image is taken. This configuration is preferable in being able to produce a good image. The reference object contained in the digital image may be spherical.

According to a second aspect of the invention, an image processing apparatus includes: a reference object discriminating unit for discriminating a reference object from a digital image that is taken by capturing an object together with the reference object; a color information extracting unit for extracting color information, in the digital image, of the reference object that is extracted by the reference object discriminating unit; a color information comparing unit for acquiring target color information of the reference object, and for comparing the color information of the reference object that is extracted by the color information extracting unit with the target color information; a correction color reproduction amount setting unit for setting a correction color reproduction amount on the basis of a comparison result of the color information comparing unit; and an image processing unit for performing image processing on the digital image in accordance with the correction color reproduction amount that is set by the correction color reproduction amount setting unit.

The reference object contained in the digital image is preferable to have a color of white or of achromatic gray. The color information extracting unit may be configured to convert image information of the extracted reference object from RGB signals to luminance/color difference signals in a uniform color space such as $L^*a^*b^*$ signals or YCC signals by a color conversion in which characteristics of a digital camera are taken into consideration; and the color information comparing unit may be configured to compare the luminance/color difference signals obtained by the conversion with the target color information; and the correction color reproduction amount setting unit may be configured to acquire a gradation correction amount and a gray balance correction amount from a luminance signal ($L^*$, Y, or the like) and color difference signals ($a^*b^*$, CC, or the like) of the luminance/color difference signals, respectively.

According to a third aspect of the invention, an image processing apparatus includes: an image input unit for receiving a plurality of digital images that are read from an image database in which digital images are stored; a reference object discriminating unit for discriminating image information of a reference object contained in each of the plurality of digital images that are received by the image input unit; a comparing unit for comparing size information and/or color information that is part of the image information of the reference object that is discriminated by the reference object discriminating unit with target size information and/or target color information as a standard; a setting unit for setting a correction size amount and/or a correction color reproduction amount on the basis of a comparison result of the comparing unit for each of the plurality of digital images; a processing unit for performing correction processing on each of the plurality of digital images in accordance with the correction size amount and/or the correction color reproduction amount that is set by the setting unit; and an output unit for integrating and layout-outputting the plurality of digital images on which the correction processing has been performed by the processing unit.

According to a fourth aspect of the invention, an image processing method includes: reading a plurality of digital images each of which is taken by capturing an object together with a reference object from a database in which digital images acquired from terminals connected via a network, for example, are stored, and discriminating the reference object from each of the plurality of digital images; extracting size information, in the digital image, of the discriminated reference object; acquiring target size information of the reference object from a memory, for example; setting a correction size amount for each of the plurality of digital images on the basis of the extracted size information of the reference object and the acquired target size information; performing enlargement or reduction processing on the object in each of the plurality of digital images using the set correction size amount; replacing image information of the discriminated reference object with background information, and integrating and layout-outputting the plurality of digital 5 images in each of which the enlargement or reduction processing has been performed on the object.

According to a fifth aspect of the invention, an image processing method includes: reading, from a database, a plurality of digital images each of which is taken by capturing an object together with a reference object, and discriminating the reference object from each of the plurality of digital images; extracting color information, in the digital image, of the discriminated reference object; acquiring target color information of the reference object; setting a correction color reproduction amount for each of the plurality of digital images on the basis of the extracted color information of the reference object and the acquired target color information; performing color correction processing on the object in each of the plurality of digital images using the set correction color reproduction amount; and integrating and layout-outputting the plurality of digital images in each of which the color correction processing has been performed on the object.

The invention can also be expressed as a program product that causes a computer to execute procedures. A program product according to a sixth aspect of the invention causes a computer to execute procedures including; discriminating a reference object from each of a plurality of digital images each of which is taken by capturing an object together with the reference object; extracting size information, in the digital image, of the discriminated reference object; acquiring target size information of the reference object; setting a correction size amount for each of the plurality of digital images on the basis of the extracted size information of the reference object and the acquired target size information; and performing enlargement or reduction processing on the each of the plurality of digital images using the set correction size amount.

According to a seventh aspect of the invention, a program product causes a computer to execute procedures including: discriminating a reference object from each of a plurality of digital images each of which is taken by capturing an object together with the reference object; extracting color information, in the digital image, of the discriminated reference object; acquiring target color information of the reference object; setting a correction color reproduction amount for each of the plurality of digital images on the basis of the extracted color information of the reference object and the acquired target color information; performing color correction processing on the each of the plurality of digital images using the set correction color reproduction amount; replacing image information of the discriminated reference object with background color information.

According to the invention, it is possible to lay out in an integrated manner and output a plurality of images in such a state that they can be compared with each other more correctly in size and image quality.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An image processing apparatus comprising:
    a reference object discriminating unit that discriminates a reference object from a digital image that is taken by capturing an object together with the reference object;
    a size information extracting unit that extracts size information, in the digital image, of the reference object that is discriminated by the reference object discriminating unit;
    a size information comparing unit that acquires target size information of the reference object, and compares the size information of the reference object that is extracted by the size information extracting unit with the target size information;
    a correction size amount setting unit that sets a correction size amount on the basis of the comparison result of the size information comparing unit; and
    an image processing unit that performs image processing on the digital image in accordance with the correction size amount that is set by the correction size amount setting unit.

2. The image processing apparatus according to claim 1, wherein the image processing unit scales up or down the object in the digital image in accordance with the correction size information.

3. The image processing apparatus according to claim 1, further comprising a replacing unit that replaces image information of the reference object contained in the digital image with background image information in the digital image.

4. The image processing apparatus according to claim 3, wherein the replacing unit replaces, with the background image information, image information that is generated so as to be associated with the reference object when the digital image is taken.

5. The image processing apparatus according to claim 1, wherein the reference object to be contained in the digital image has a spherical shape.

6. An image processing apparatus comprising:
    a reference object discriminating unit that discriminates a reference object from a digital image that is taken by capturing an object together with the reference object;
    a color information extracting unit that extracts color information, in the digital image, of the reference object that is discriminated by the reference object discriminating unit;
    a color information comparing unit that acquires target color information of the reference object, and compares the color information of the reference object that is extracted by the color information extracting unit with the target color information;
    a correction color reproduction amount setting unit that sets a correction color reproduction amount on the basis of the comparison result of the color information comparing unit; and
    an image processing unit that performs image processing on the digital image in accordance with the correction color reproduction amount that is set by the correction color reproduction amount setting unit.

7. The image processing apparatus according to claim 6, wherein the reference object contained in the digital image has a color of white or of achromatic gray.

8. The image processing apparatus according to claim 6, wherein the color information extracting unit converts image information of the extracted reference object from RGB signals to luminance/color difference signals by a color conversion in which characteristics of a digital camera are taken into consideration,
    wherein the color information comparing unit compares the luminance/color difference signals obtained by the conversion with the target color information, and
    wherein the correction color reproduction amount setting unit acquires a gradation correction amount and a gray balance correction amount from a luminance signal and color difference signals of the luminance/color difference signals, respectively.

9. An image processing apparatus comprising:
    an image input unit that receives a plurality of digital images that are read from an image database in which digital images are stored;
    a reference object discriminating unit that discriminates image information of a reference object contained in each of the plurality of digital images that are received by the image input unit;
    a comparing unit that compares information including at least one of size information and color information included in the image information of the reference object discriminated by the reference object discriminating unit with information including at least one of target size information and target color information as a standard;

a setting unit that sets at least one of a correction size amount and a correction color reproduction amount on the basis of the comparison result of the comparing unit for each of the plurality of digital images; and a processing unit that performs correction processing on each of the plurality of digital images in accordance with at least one of the correction size amount and the correction color reproduction amount that is set by the setting unit.

10. The image processing unit according to claim 9, further comprising an output unit that outputs the plurality of digital images in a form in which the plurality of digital images being integrated and arranged in a pattern.

11. An image processing method comprising:

reading out a plurality of digital images each of which is taken by capturing an object together with a reference object;

discriminating the reference object from each of the plurality of digital images;

extracting size information, in the digital image, of the discriminated reference object;

acquiring target size information of the reference object;

setting a correction size amount for each of the plurality of digital images on the basis of the extracted size information of the reference object and the acquired target size information; and performing a process of scaling up or down the object in each of the plurality of digital images in accordance with the correction size amount.

12. The image processing method according to claim 11, further comprising replacing image information of the discriminated reference object with background information.

13. The image processing method according to claim 11, further comprising outputting the plurality of digital images in a form in which the plurality of digital images being integrated and arranged in a pattern.

14. An image processing method comprising:

reading out a plurality of digital images each of which is taken by capturing an object together with a reference object;

discriminating the reference object from each of the plurality of digital images;

extracting color information, in the digital image, of the discriminated reference object;

acquiring target color information of the reference object;

setting a correction color reproduction amount for each of the plurality of digital images on the basis of the extracted color information of the reference object and the acquired target color information; and performing color correction processing on the object in each of the plurality of digital images in accordance with the set correction color reproduction amount.

15. The image processing method according to claim 14, further comprising outputting the plurality of digital images in a form in which the plurality of digital images being integrated and arranged in a pattern.

16. A computer-readable medium storing an image processing program for causing a computer to execute procedures comprising:

reading out a plurality of digital images each of which is taken by capturing an object together with a reference object;

discriminating the reference object from each of the plurality of digital images;

extracting size information, in the digital image, of the discriminated reference object;

acquiring target size information of the reference object;

setting a correction size amount for each of the plurality of digital images on the basis of the extracted size information of the reference object and the acquired target size information; and performing a process of scaling up or down the object in each of the plurality of digital images in accordance with the correction size amount.

17. A computer-readable medium storing an image processing program for causing a computer to execute procedures comprising:

reading out a plurality of digital images each of which is taken by capturing an object together with a reference object;

discriminating the reference object from each of the plurality of digital images;

extracting color information, in the digital image, of the discriminated reference object;

acquiring target color information of the reference object;

setting a correction color reproduction amount for each of the plurality of digital images on the basis of the extracted color information of the reference object and the acquired target color information; and performing color correction processing on the object in each of the plurality of digital images in accordance with the set correction color reproduction amount.

18. The computer-readable medium storing an image processing program according to claim 17, further causes the computer to execute outputting the plurality of digital images in a form in which the plurality of digital images being integrated and arranged in a pattern.

* * * * *